United States Patent Office 3,430,525
Patented Mar. 4, 1969

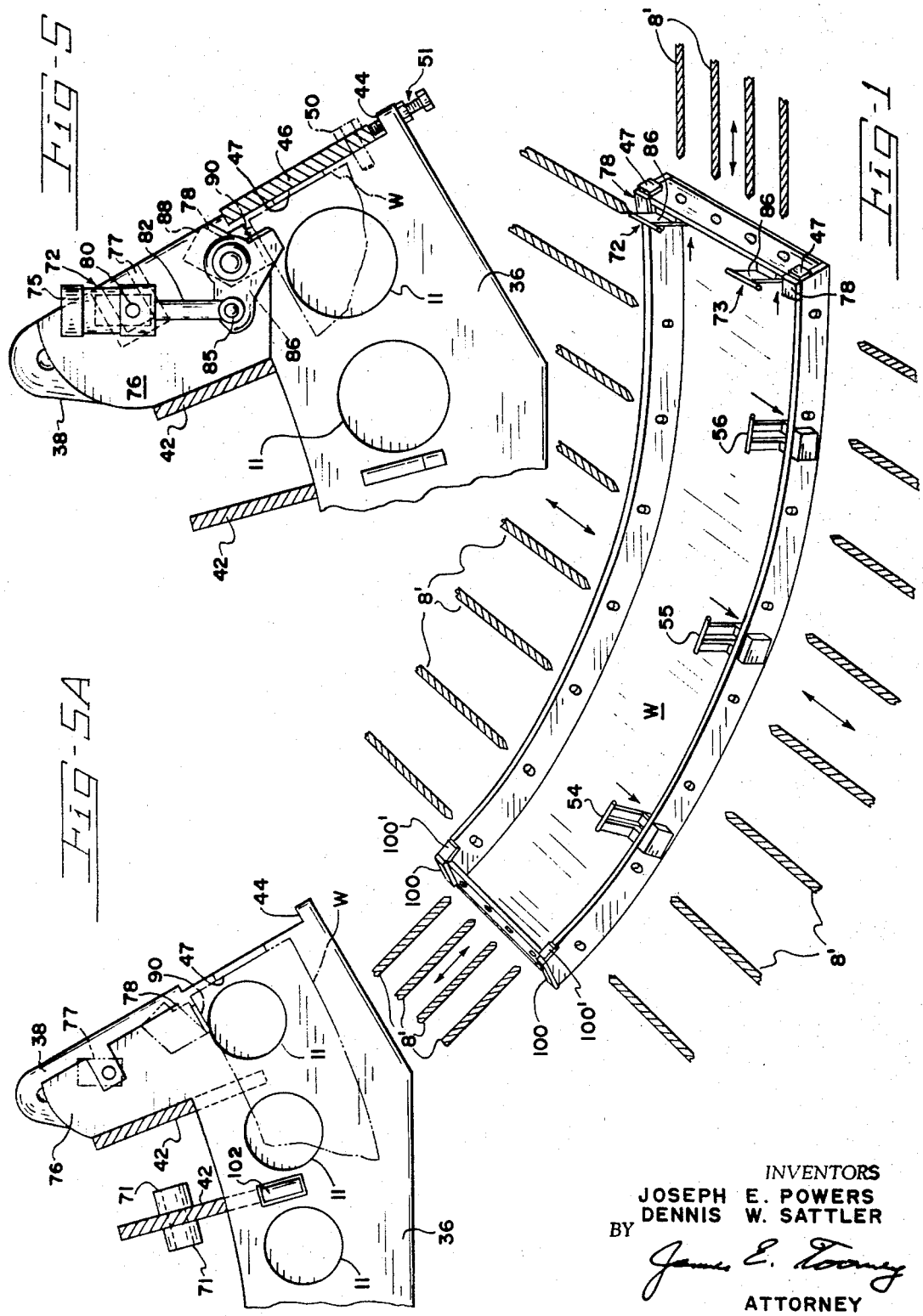

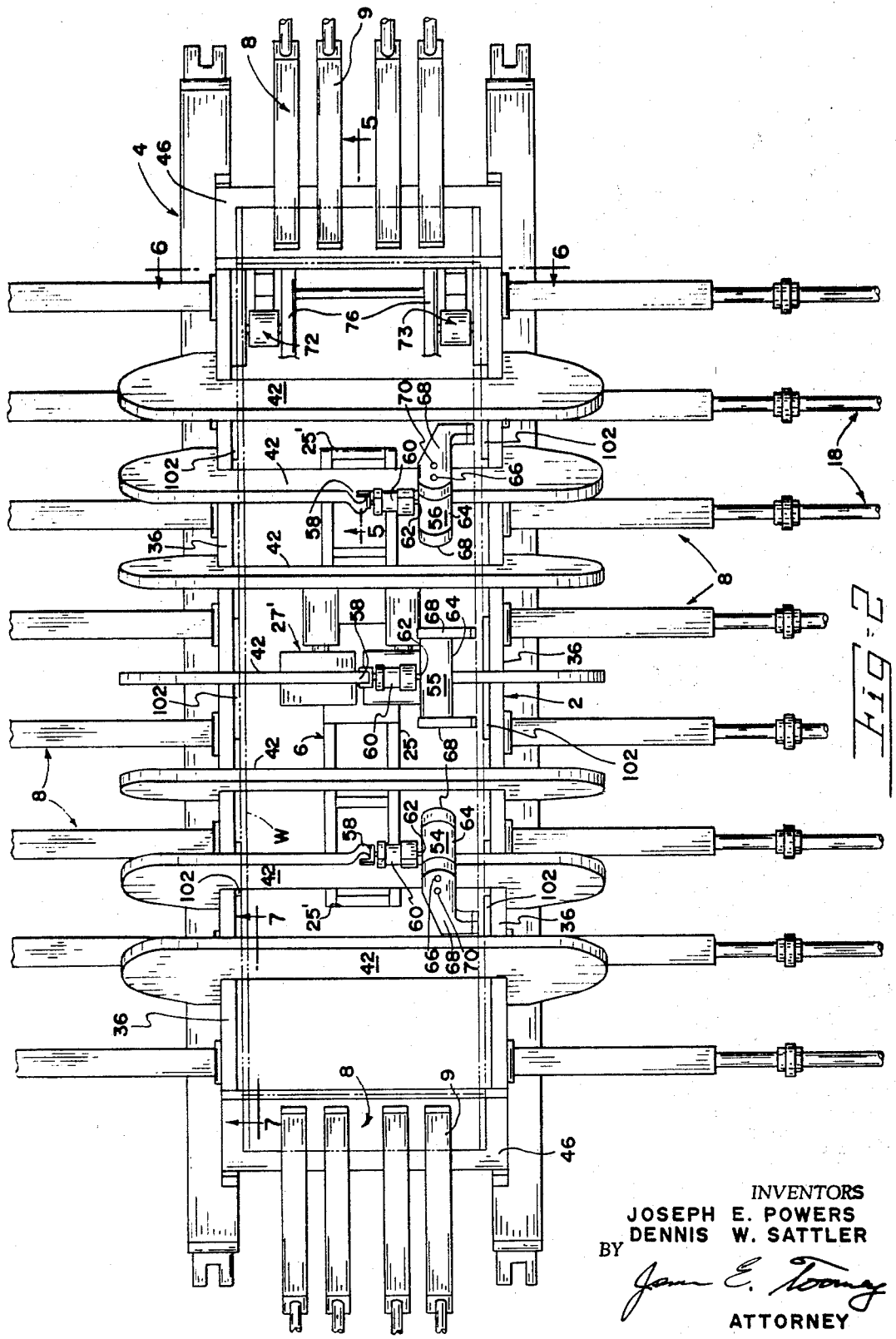

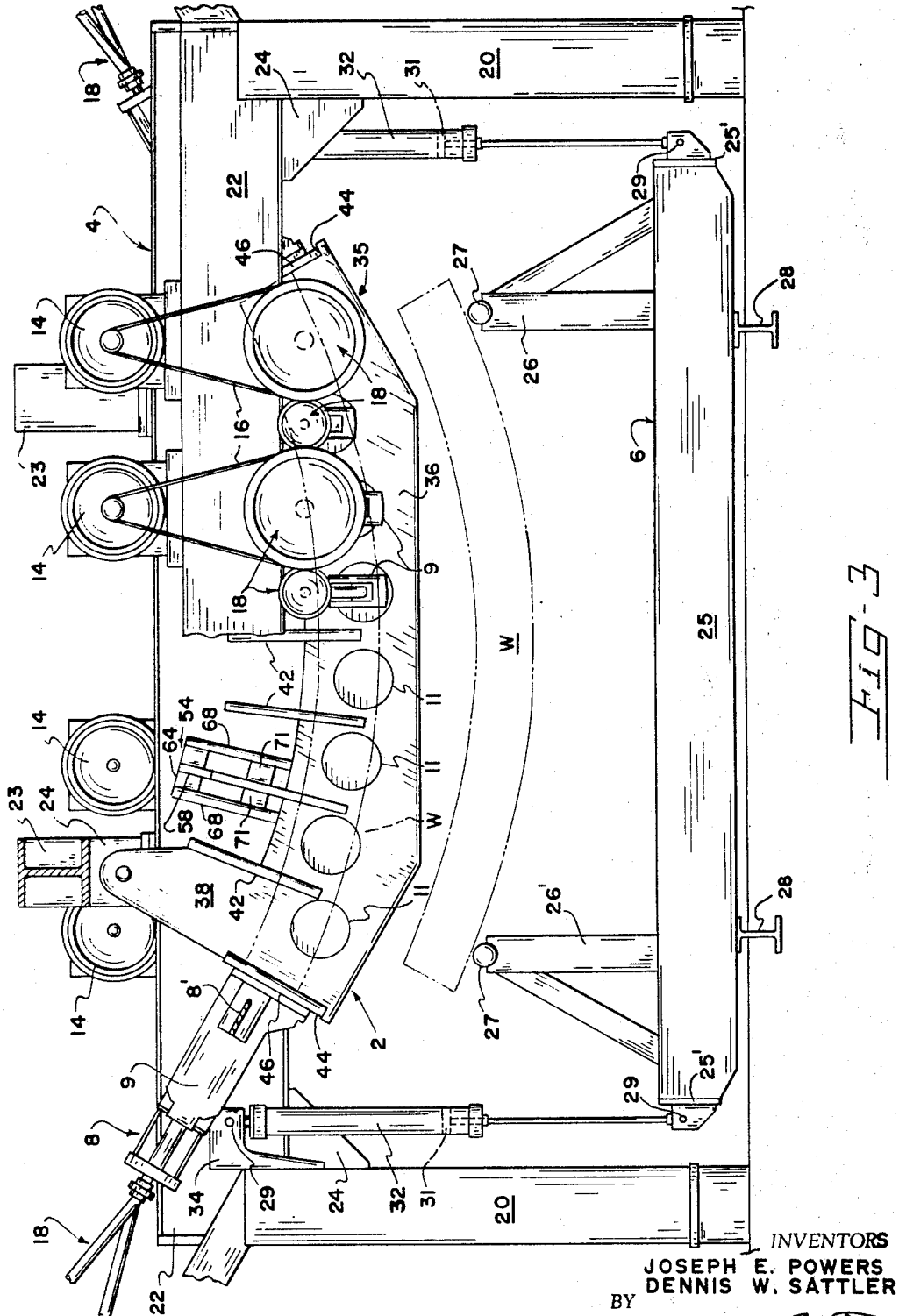

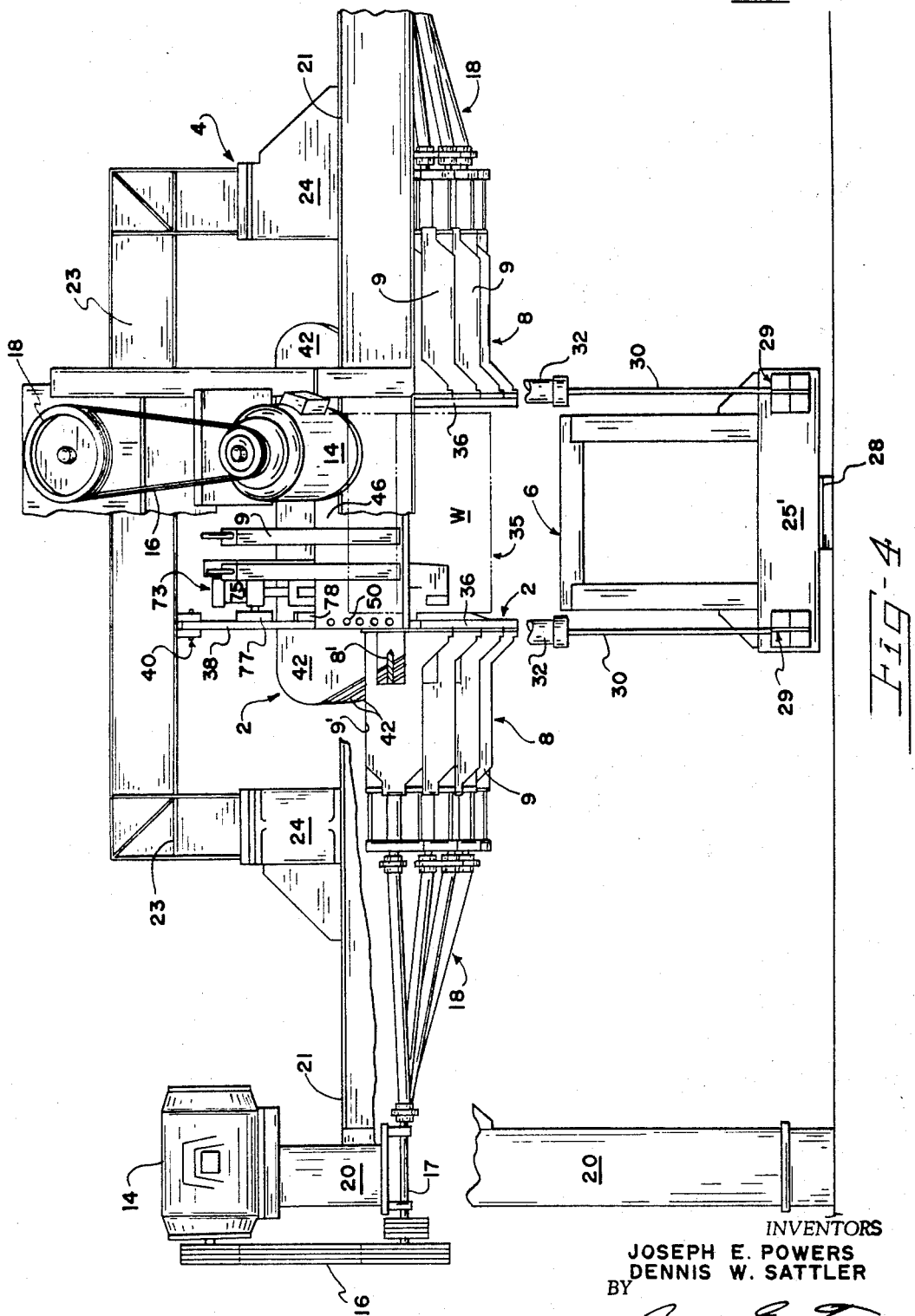

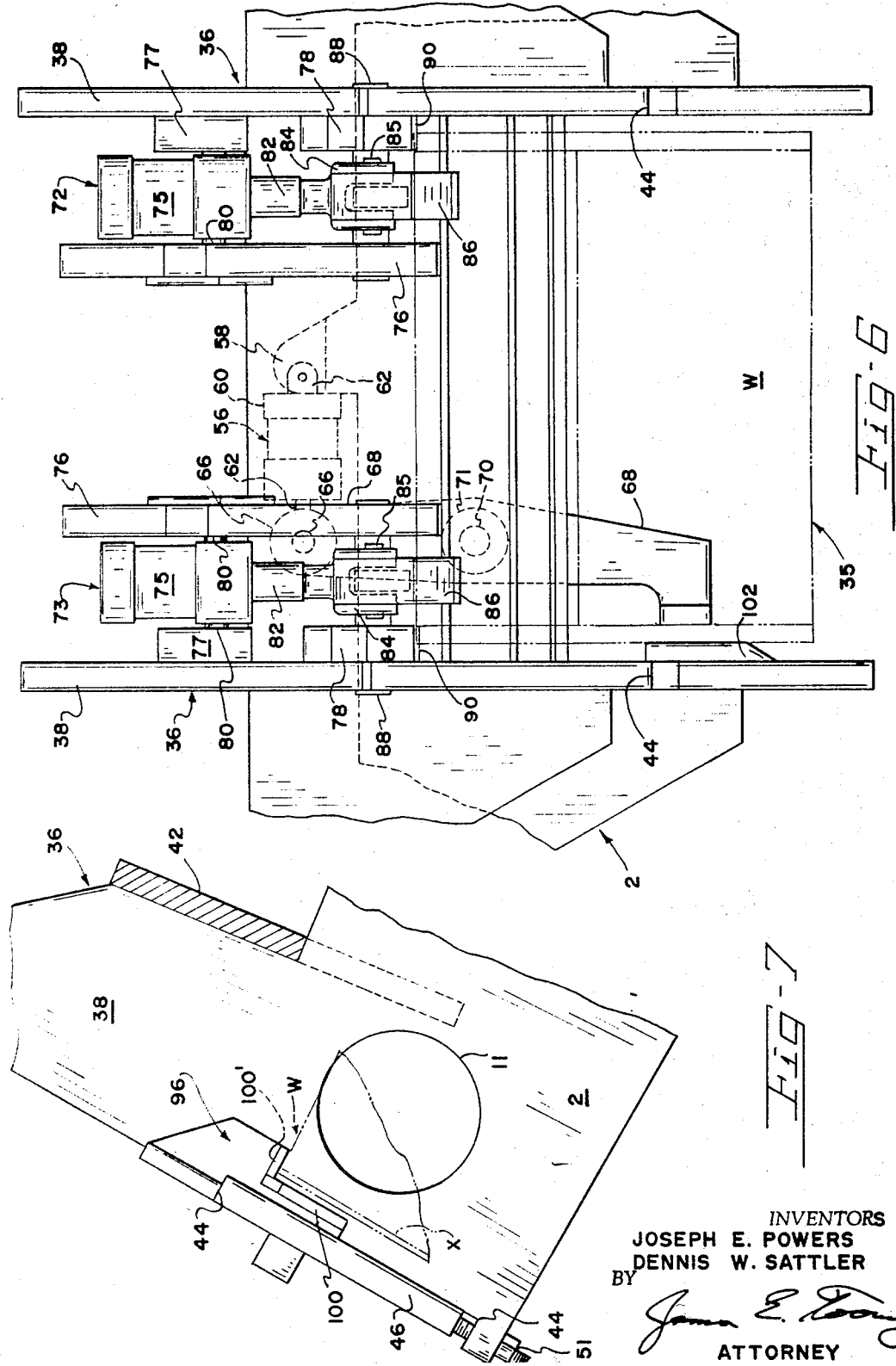

3,430,525
WORKPIECE POSITIONING AND SECURING DEVICE
Joseph E. Powers, Napa, and Dennis W. Sattler, Vacaville, Calif., assignors to Kaiser Steel Corporation, Oakland, Calif., a corporation of Nevada
Filed Mar. 27, 1967, Ser. No. 626,134
U.S. Cl. 77—63                               17 Claims
Int. Cl. B23b 47/28, 39/16

ABSTRACT OF THE DISCLOSURE

A workpiece positioning and securing device comprised of an open ended form and a series of workpiece engaging grapple means specially arranged on said form. The workpiece engaging grapple means are specially oriented on the open ended form in angularly disposed relationship to each other whereby as the workpiece is inserted by appropriate means into the form through the open end thereof one of the grapple means can be operated to loosely hold the workpiece while another of the grapple means can be operated to move the workpiece so as to properly position the workpiece in the form. Thereafter, both grapple means are operated to firmly grip and clamp the workpiece to the form in the finally desired position whereby the workpiece can then be drilled or welded, etc.

Background of the invention

This invention relates to a workpiece positioning and securing apparatus for orienting and then holding a workpiece in the desired position in the form or fixture so that it can be conveniently worked on simultaneously from a plurality of directions or sides.

Workpiece positioning apparatus have been designed and used in the past for positioning and holding a workpiece in place so that the workpiece can be operated on by drilling tools, welding tools, etc. For example, prior art holders and fixtures useable for such purposes are disclosed in United States Patents 1,702,370, 1,873,547 and 2,324,919. These prior art devices, however, were deficient for various reasons including the fact that they did not always provide for convenient access to the workpiece simultaneously from a plurality of directions, or in the fact that they were not readily susceptible to automatic or semi-automatic operation and thus required a great deal of manual effort in operating the equipment and in adjusting the workpiece in the holding and positioning equipment, or the fact that their design militated against the quick insertion into and removal of the workpiece from the form.

Summary of the invention

It is the primary purpose of the instant invention to provide an improved open ended workpiece holding form provided with a series of uniquely arranged grapple elements, which grapple elements perform the dual function not only of firmly holding the workpiece in the proper position within the form or fixture during the actual work performing operation, but also of advantageously initially orienting the workpiece within the fixture relative to workpiece engaging tools. The improved apparatus also lends itself admirably to automatic or semi-automatic operation and the workpiece can be conveniently and rapidly inserted into and withdrawn from the form.

Brief description of the drawings

In the accompanying drawings:
FIG. 1 is an overall perspective and diagrammatic view of a typical workpiece that can be inserted in the improved fixture and grapple means of the instant invention and illustrates how it can be simultaneously worked on from a plurality of directions;

FIG. 2 is a plan view of a segment of the overall drilling apparatus generally shown in FIGS. 3 and 4 with parts removed and other parts broken away and discloses how the improved workpiece holding form and grapple means can be used with such an apparatus;

FIG. 3 is a side elevational view partially in section and with parts added and with other parts broken away of the apparatus shown in FIG. 2;

FIG. 4 is an end elevational view with parts added and other parts removed or broken away of the apparatus shown in FIGS. 2 and 3;

FIG. 5 is a sectional view of the apparatus shown in FIG. 2 when taken generally along the line 5—5 thereof and with parts removed or broken away for the sake of clarity;

FIG. 5A is a view similar to FIG. 5 with certain parts removed and other parts broken away;

FIG. 6 is a sectional view taken generally along the line 6—6 of FIG. 2 with parts added and other parts broken away or removed for the sake of clarity;

FIG. 7 is a sectional view generally taken along line 7—7 of FIG. 2; and

Description of the preferred embodiments

Figure 8:
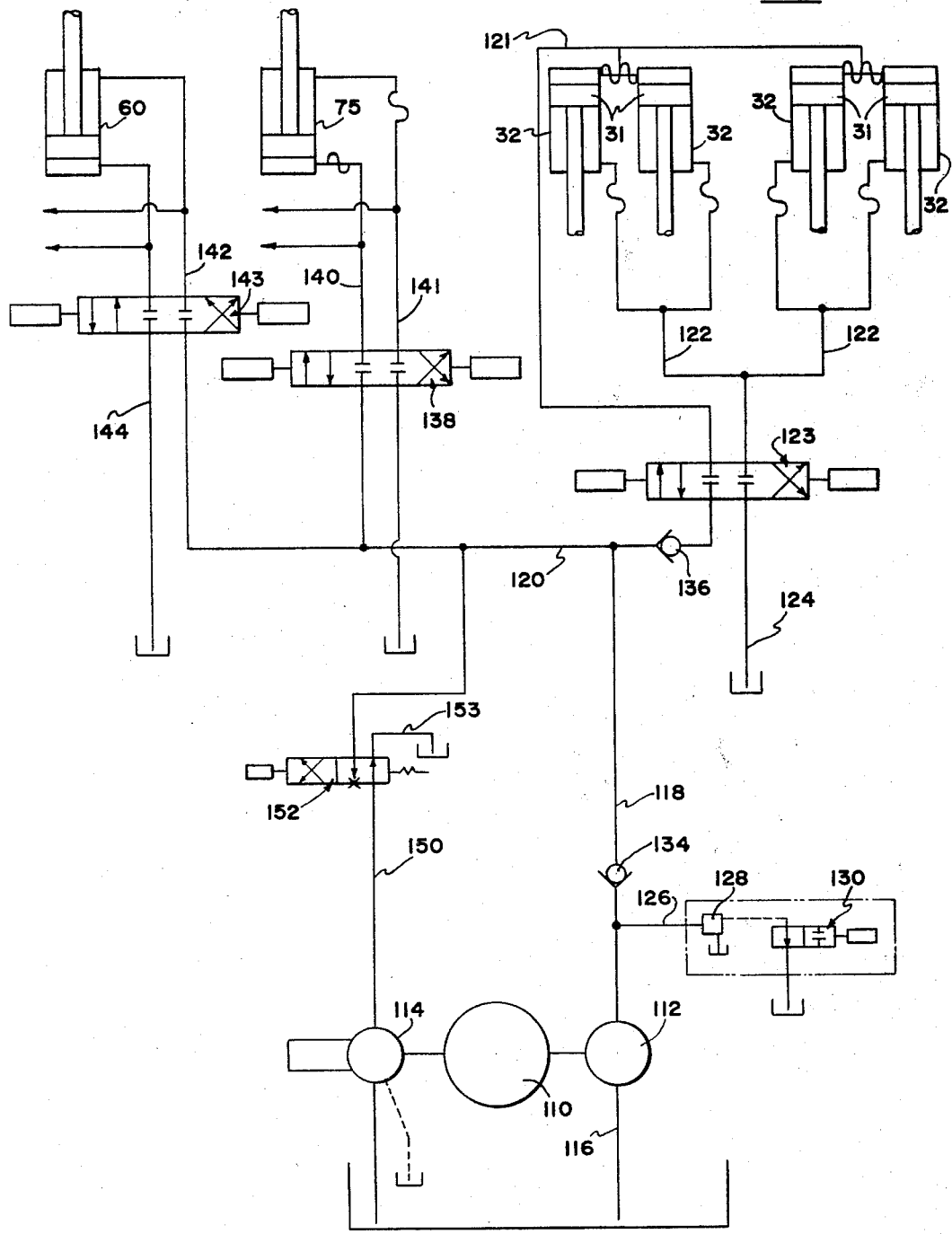
FIG. 8 is a schematic diagram of a suitable control circuit that can be used for operating the grapple devices, etc. used with the open ended workpiece holding form of the instant invention.

With further reference to the drawings and in particular FIGS. 1–6, a preferred embodiment of the improved open ended form or fixture and grapple means of the instant invention generally comprises an open ended form 2 suspended on an appropriate framework 4. A cradle elevator 6 and a series of work performing tools, such as drilling devices 8, are associated with the framework 4 and form 2. The drilling devices 8 surround the form 2 on all four sides.

Although the instant invention will be described with particular reference to its use in the production of tunnel liner segments or workpieces W wherein the segments are to be drilled with a predetermined series and arrangement of openings through which bolts are later passed for the purpose of securing the individual tunnel liner segments together in the formation of the final tunnel at the job site, it is to be understood that the teachings of the invention are equally applicable to other work performing operations, such as where workpiece elements are to be welded from various sides or where milling or cutting equipment may be used for the purpose of milling or cutting various portions of a workpiece.

Since the framework 4 and drilling devices 8 do not form essential parts of the invention, it is believed that a brief description of the same will suffice. The drilling devices 8, which are of conventional design, are mounted battery fashion about the four sides of the form 2 disposed in the framework 4 by any appropriate means. The chucks or holders 9 for the individual drills 8' are disposed adjacent openings 11 in the sides and ends of form 2. The various batteries of drills 8' are powered by a series of motors 14, pulleys 16 and suitable gearing and flexible coupling assemblies 18. The drill holders 9 include the usual movable drill bits (not shown) for moving the individual drills 8' into and out of drilling position during the drilling operation.

The framework 4 includes the usual floor mounted upright beams or posts 20 which support horizontal cross beams 21, 22, 23 and brackets 24 from which form 2 is suspended and upon which the various drill devices are also mounted in the manner shown.

The overall framework 4 in effect forms a bridge overtop of the cradle 6, which is used to insert and hold a workpiece W in the form 2 and then removes the workpiece W therefrom upon completion of the drilling operation. As indicated particularly in FIGS. 2 and 3, cradle 6 comprises side and end elements 25 and 25'. Standards 26 and 26' fixedly support a series of workpiece engaging rods 27. The bottom of workpiece W which in the instant case is an arcuate box-like tunnel liner segment is adapted to rest directly upon the rods 27. The ends of the cradle are secured by ball joint assemblies 29 to the bottom ends of a series of piston rods 30 affixed to pistons 31 disposed within the four cylinders 32. The upper ends of the cylinders 32 are likewise mounted by means of similar ball joint assemblies 29 disposed within the brackets 34 affixed to the framework 4. The cradle 6 is suspended from the framework 4 directly beneath form 2 in such a fashion that it is substantially aligned with the open end or bottom 35 of the form 2 and in its lowered position nests against spaced I-beams 28 anchored and partially sunken in the floor.

Form 2 is generally made up of a pair of heavy metal plates 36 located in spaced relationship to one another and of a partially arcuate configuration. The ends of plates 36 are provided with upstanding ears 38 which are pinned to the brackets 40 attached to framework 4 as shown in FIG. 4. A series of generally U-shaped and spaced bridging elements or ribs 42 are welded to the opposing plates 36 and these ribs and plates 36 when assembled give the form 2 a somewhat skeletal configuration. These bridging elements 42 act to close off the top of the form while leaving the bottom end 35 open to receive the workpiece W.

The opposing extremities of the plates 36 are provided with cutaway sections or notches 44 which are adapted to receive the bridging plates 46. Each plate 46 serves a dual function in that it serves as a means for mounting the end drill assemblies 8 adjacent form 2 and also as a means for carrying certain workpiece W engaging pads 47, 100 and 100', the functions of which will be described more fully hereinafter. Bolts 50 which are adapted to pass through aligned openings in the plates 46 and the ends of plates 36 can be used to anchor plates 46 in place along with set screws 51 after screws 51 have been properly adjusted.

By referring particularly to FIGS. 1, 2, 3 and 4, it will be observed that a series of side grapple assemblies 54, 55 and 56 are pivotally affixed to the tops of certain of the channel-shaped ribs 42 of form 2. The securement of the grapples to the ribs 42 is effected in the following fashion. Each of the grapple mounting ribs is provided with an apertured ear element 58. A piston rod or cylinder assembly 60 is pivotally attached to the ear 58 by the forked end of a piston rod 62 which passes through suitable aligned openings in the ear and the cylinder of the piston rod assembly 60. The opposite end of the piston rod 62 of the piston and cylinder assembly 60 is connected to a sleeve 64 within which a linking pin 66 is disposed. A pair of articulated arms 68 are also mounted on this same pin 66 at the opposite extremities thereof. The intermediate portion of each arm 68 is pivotally secured to the bridging element to which the cylinder assembly 60 is attached by means of a pivot pin 70 located as indicated in FIGS. 3 and 5A in the pin holders 71 secured to the grapple mounting rib 42. Thus it will be observed that when cylinder rod 62 is retracted within the cylinder assembly 60, the arms 68 will be moved outward in the direction of the arrows in FIG. 1 and into engagement with the inside surface of a side wall of the workpiece W which has been previously inserted within the form by means of the cradle 6.

As indicated particularly in FIGS. 1, 2, 4, 5 and 6, one of the endmost ribs 42, such as the right-hand end plate 42 of FIG. 2, carries a pair of end grapple assemblies 72 and 73.

Inasmuch as each grapple assembly 72 and 73 is mounted in a similar fashion on the form 2, a description of the mounting of one will suffice for both, reference being had particularly to FIG. 6. A grapple assembly includes an inner mounting bracket 76 and two outer stub brackets 77 and 78. The inner bracket 76 is welded directly to the endmost rib element 42 and the stub brackets 77 and 78 are secured directly to the ear portion 38 of the associated plate 36. A cylinder 75 is mounted between brackets 76 and 77 by means of pins 80 and the exposed part of the piston rod 82 which protrudes from the cylinder 75 has a forked end 84. Forked end 84 is pinned by a pin 85 to an arm element 86 pivotally connected by means of a pivot pin 88 to the lower outside bracket segment 78 and the lower portion of the inner bracket 76. From the above, it will be seen that when the piston rod 82 is extended from the cylinder 76, it will effect a pivoting of the articulated arm 86 outwardly and into engagement with the inside surface of the right-hand end wall of the workpiece W located within form 2.

The lower surface 90 of the outside and lower bracket element 78 advantageously serves as a workpiece stop element and acts in conjunction with the pads or shim elements 47 on the associated end plate 46 as a means for orienting and centering the workpiece W in the form 2 by engaging the top surface of an end wall of the workpiece as the outside surface of the same end wall comes into engagement with a pad 47 on the associated end wall plate 46.

A similar pad arrangement is used in the case of the left-hand end wall plate 46 shown in FIG. 7 of the drawings. In this instance the left-hand end wall plate 46, which bridges the gap between the plates 36 of form 2 and fits into the notches 44 thereof, is provided on the inside surface thereof with a pair of L-shaped elements 96, only one of which is shown. Element 96 is welded to plate 46 and carries a pair of angularly disposed shim-type pads 100 and 100'. The topmost shim-type pad 100' is adapted to engage the top surface of the workpiece at the left-hand end thereof, while the side shim-type pad 100 is adapted to engage the outside surface at the left-hand end of the workpiece when the workpiece is inserted in form 2.

In general, in the operation of the instant apparatus, it is contemplated after the workpiece has been seated properly by a fork lift truck or the like on the cradle 6 in its lowered position, while also being substantially oriented with respect to the form, that the cradle 6 can then be raised by means of the pistons 31 in the cylinder assemblies 32. As the cradle 6 is raised, the workpiece W is projected through the open bottom 35 of the form 2 until the opposing ends of the workpiece more or less contact and generally register with the various pad elements or surfaces 47, 100, 100' and 90. To assure proper registry of the workpiece W against the topmost pad elements 90 and 100' and general registry with the side pad elements 47 and 100, the overall length of the workpiece W is somewhat less than the distance extending between the pad elements 47 and 100. Due to the ball joint suspension assemblies 29 of the cradle 6, the cradle can also be joggled, if necessary, to help insure proper registry of the workpiece W with the aforesaid top pad elements; even when the workpiece is disposed somewhat off center on the cradle 6. In addition, it is evident that the ends of the workpiece in being tapered inwardly and upwardly further contribute to the workpiece being properly registered within the form 2 upon raising of the cradle 6. As the cradle 6 is elevated, various arms of the grapple assemblies remain retracted so that the workpiece sides and ends can slide in between the grapple arms and the sides and ends of the form 2.

It is also to be noted that shim-type spacer elements 102, the bottoms of which are chamfered, are advantageously provided on the inside of the side plates 36 of the form 2 whereby the sides of the workpiece do not come into full contact with the side plates 36 but are spaced therefrom as well as from end form plates 46. This spacing of form and workpiece allows the chips, etc., from the drilling operations to fall freely through the form and onto the floor whence they can then be picked up by a suitable cleaning device. The opposing spacer elements 102 on each side plate 36 are spaced from each other, within tolerance limits, at a distance approximating the overall width of the workpiece.

Despite the fact that the orientation of the cradle 6 relative to the open bottom of form 2 is such that the workpiece when raised by cradle 6 is brought into engagement and substantial registry with pad elements or surfaces 47, 100, 100' and 90, absolute registration of the workpiece with the drills 8' is required for precise drilling of the workpiece.

The various grapple elements are used to advantage to obtain this exact and accurate registration by being activated in a unique fashion. First of all, the side grapple assemblies are activated at low pressure so as to exert a low pressure on the one side of the workpiece. Thereafter, the end grapple assembly or clamp assemblies are actuated under low pressure so as to cause any endwise shifting of the workpiece that is required even though it may be only a few thousandths of an inch and until the end of the workpiece is fully backed up by the pads 47 on the end plate 46 and the workpiece is now in the finally desired and exact position for the drilling operation. At this time, the grapple elements are actuated under high pressure along with the cradle 6 so as to rigidly hold the workpiece in the proper position throughout the drilling operation. Usually the workpiece W at its left end may be further slightly spaced from the side pad elements 100, as indicated by the dotted line X in FIG. 7, due to the actuation of the end grapple assemblies 73 against the right end of the workpiece W. After the drilling operation is completed, the high pressure energization of grapple assemblies and cradle is converted to low pressure, the grapple arms are disengaged from the workpiece and the cradle 6 allowed to recede away from form 2 and effect a withdrawal of the workpiece W from form 2. Prior to this time, of course, the drills 8' will have been withdrawn from the workpiece.

The means for operating the cradle assembly 6 and the various grapple assemblies 54, 56, 72 and 73 in the manner generally discussed above will now be specifically described, reference being had particularly to FIG. 7.

As indicated in FIG. 7, a motor 110 is adapted to drive a pair of pumps. One pump 112 is a constant volume type pump, while pump 114 is a pressure compensating pump. Pump 114 can be a pump of the type sold by Vickers, Inc. of El Seguendo, Calif., under Model No. PVB5–FLSY–10–C–10. It is referred to as a pressure compensating pump in that once it is preset it will retain a preset pressure in lines to which it is connected and will continue to exert that same pressure even though it has to, in effect, deadhead or idle during use.

The pump 112 is connected to a tank by line 116. A line 118 leads from the pump 112 to a line 120, one branch 121 of which is connected to the piston side of the several lifting cradle cylinders 32 through the medium of a three position valve 123. The rod side of the pistons 31 in the cylinders 32 is connected by lines 122 to the tank through the medium of a main line 124 and valve 123. For idling purposes, the output side of pump 112 is connected to the tank by means of a line 126, which leads through a pressure relief valve 128, and then through a solenoid operated two-position valve 130. Various one-way ball check valves 134 and 136 are also disposed in lines 118 and branch line 121.

The line 120 is further connected through the medium of a three-position valve 138 and a line 140 to the piston ends of two end-grapple or clamping cylinders 75, only one of which is shown. The rod end of each clamping cylinder 75 is connected to the tank by means of valve 138 and a line 141. Line 120 is connected to the cylinders 60, only one of which is shown, of the side grapple assemblies 54, 55 and 56 by means of a line 142 and a three-position valve 143. The piston end of a cylinder 60 is connected to the tank through the medium of valve 143 and a line 144. Finally, pump 114 is connected to line 120 by means of line 150 and the two-position valve 152. Valve 152 is also connected to a line 153 which leads to the tank.

The operation of the above described control system is as follows after the workpiece W has been deposited on cradle 6.

Valve 152 is initially maintained in a position whereby fluid from line 150 will be returned to the tank through the line 153. Valve 130 is first operated such that it is closed and fluid under low pressure of about 350 p.s.i. is passed successively through lines 118, 120 and 122 into the rod side of the cylinder assemblies 32 while fluid is simultaneously evacuated therefrom and out of lines 121, back to the tank by the appropriate setting of valve 123. This causes the cradle 6 to move upwardly under low pressure along with the workpiece. After the cradle 6 and workpiece W have reached their uppermost positions such that the workpiece substantially abuts the various stop elements or surfaces 47, 100, 100' and 90, the operation of the grapple assemblies can take place.

When the aforesaid cradle and workpiece position is reached, the operator next energizes valve 143 whereby fluid can pass, still under low pressure, through lines 120 and 142 through the valve 143 to the rod ends of cylinders 60 to thereby cause the actuation of the side grapples or side clamps. After these side clamps have been brought into contact with the inside surface of the one side of the workpiece W, the valve 143 is closed. Valve 143 is a bleeding-type of valve sold by Vickers, Inc. of El Segundo, Calif., under Model No. DG4S4–0133C whereby, in its closed or neutral position, a slight bleeding of the valve takes place back into line 144 so that a slight relaxation of the arms 68 on the side grapple means relative to the workpiece takes place whereby the workpiece can be shifted a few thousandths of an inch endwise even though the grapple arms 68 maintain contact with a side of the workpiece W so as to finally set the workpiece in a precise drilling position.

The next step in the operation of the circuit is to operate valve 138 in the line 141 leading to the end grapple clamping cylinders 75. This action will cause the end grapple arms 86 to shift the workpiece endwise until it fully abuts the pads 47 on the right-hand plate 46 of form 2. Upon full contact of workpiece and pads 47, valve 152 is energized along with valve 130 whereby fluid from pump 112 can be evacuated to the tank while fluid from pump 114 is now forced under a predetermined high pressure through line 150 into line 120. At this same time, valve 143 is operated to put line 142 again into communication with rod end of side grapple clamping cylinders 60. Pump 114 can be advantageously set so as to cause fluid to pass into all of the various cylinder assemblies 32, 60 and 75 under about 1500 p.s.i. This high pressure is maintained in the system at this time by virtue of the pressure compensating pump 114 until after the drilling operation has been completed. The high pressure is assurance that the workpiece will be rigidly locked to the form during the drilling.

Upon completion of the drilling, the operator cuts pump 114 out of the line by shifting valve 152 so that pump 114 is connected to the tank. He then shifts valves 123, 130, 138 and 143 whereby pump 112 cannot pass fluid under low pressure through the various lines into the rod ends of cylinders 32 and 60 and the piston ends of cylinders 75 while fluid is simultaneously evacuated out of the line 144 of cylinders 60, line 141 of cylinders 75 and line 121 of cylinders 32 back to the tank.

As the workpiece W is retracted from the form 2 and floored by means of the cradle 6, it may be that the cradle 6, due to ball joint suspension system, is not completely level with the floor. If this is the case, a slight pushing down of the cradle 6 by the operator will cause it to retract into its final at-rest position on I-beams 28 or in the alternative an appropriate valving mechanism could be incorporated in the control system to fully evacuate cylinders 32 and effect proper leveling of the cradle.

An advantageous embodiment of the invention has been disclosed and described. It is obvious that various changes and modifications may be made therein without departing from the spirit and scope thereof as defined by the appended claims, wherein:

What is claimed is:

1. A workpiece positioning and securing apparatus comprising the combination of a framework, an open ended form affixed to the framework, a first workpiece engaging grapple means mounted on said form, a second workpiece engaging grapple means mounted on said form, said first and second grapple means being angularly disposed relative to each other, means for operating said first and second grapple means in a successive fashion whereby one of said grapple means can slidably engage one portion of a workpiece inserted within said form through an open end thereof while said other grapple means can simultaneously engage an adjacent portion of the workpiece so as to effect a shifting of said workpiece in the form and thereby precisely orient and position the workpiece relative to a work performing member, means for effecting a partial relaxation of the one grapple means relative to the workpiece during the shifting of the workpiece in the form by the other grapple means, said means for effecting the relaxation being operable in synchronization with the shifting operation of the other grapple means and a common high pressure means operable when said workpiece has been finally positioned within said form to actuate all of said grapple means and effect a tight clamping of the workpiece to said form.

2. A workpiece positioning and securing apparatus as set forth in claim 1, including a common means for inserting a workpiece through the open end of the form and for cooperating with said grapple means to hold and clamp the workpiece in the final precise working position.

3. A workpiece positioning and securing apparatus as set forth in claim 1, whereby a side of the form upon which a grapple means is disposed is further provided with a plurality of openings for receiving drilling tools.

4. A workpiece positioning and securing apparatus as set forth in claim 1, wherein each of said grapple means includes articulated arms.

5. A workpiece positioning and securing apparatus comprising the combination of a framework, an open ended form affixed to the framework, a first workpiece engaging grapple means mounted on said form, a second workpiece engaging grapple means mounted on said form, said first and second grapple means being angularly disposed relative to each other, means for operating said first and second grapple means in a successive fashion whereby one of said grapple means can slidably engage one portion of a workpiece inserted within said form through an open end thereof while said other grapple means can engage an adjacent portion of the workpiece so as to effect a shifting of said workpiece in the form and thereby precisely orient and position the workpiece relative to a work performing member, means operable when said workpiece has been positioned to actuate all of said grapple means and effect a tight clamping of the workpiece in said form and stop elements on said form engageable by certain portions of the workpiece, said stop elements being adapted to cooperate with the grapple means for aligning the workpiece with the form.

6. A workpiece positioning apparatus as set forth in claim 5, including a cradle elevator for inserting the workpiece through the open end of the form and for bringing the workpiece into contact with the stop elements of the form and for maintaining the contact between stop elements and workpiece during a work performing operation.

7. A workpiece positioning and securing apparatus comprising the combination of a framework, an open ended form affixed to the framework, a series of articulated workpiece engaging grapple means mounted on the form, certain of said grapple means being angularly disposed relative to others of said grapple means whereby said various grapple means can engage certain adjacent side portions of a workpiece inserted within the form through the open end thereof, a series of stop elements on said form, said stop elements being engageable by the workpiece during the positioning of the workpiece in the form for the purpose of aligning the workpiece with the form for later work performing operations, and cradle means arranged in spaced relationship with respect to and aligned with the open end of the form for inserting a workpiece through the open end of the form and bringing said workpiece into engagement with said workpiece aligning stop elements and means for floatingly mounting said cradle means.

8. A workpiece positioning and securing apparatus as set forth in claim 7, including spacer elements on said form for maintaining the workpiece in a slightly spaced relationship relative to the sides of the form.

9. A workpiece positioning and securing apparatus as set forth in claim 7, including means for actuating said grapple means after said workpiece has been brought into engagement with said form aligning stop elements whereby said grapple means can clamp the workpiece to the form.

10. A workpiece positioning and securing apparatus as set forth in claim 7, including means for mounting one of said grapple means on one side of said form, means for mounting another of said grapple means on an adjacent side of said form and means for selectively operating certain of said grapple means prior to others of said grapple means whereby said certain grapple means can shift the workpiece into the final workpiece position.

11. A workpiece positioning and securing apparatus comprising the combination of a framework, an open ended form affixed to said framework, a plurality of articulated workpiece engaging grapple means mounted on the inside of said form and adapted to cooperate with a pair of adjacent sides of said form in holding a workpiece in the form, means for inserting a workpiece into said form through the open end thereof, means for selectively operating one of said grapple means prior to another of said grapple means whereby said one grapple means can shift the workpiece and fully position the workpiece within said form so that it can be worked on, a common high pressure means for actuating all of said grapple means whereby all of said grapple means can then clamp the workpiece rigidly to the form during the work performing operation and means for effecting a partial relaxation of the one grapple means relative to the workpiece during the shifting of the workpiece in the form by another grapple means, said means for effecting said relaxation being operable in synchronization with the shifting operation of the other grapple means.

12. A workpiece positioning and securing apparatus as set forth in claim 11, including stop means on the form and engageable by the workpiece for aligning the workpiece with the form.

13. A workpiece positioning and securing apparatus comprising the combination of a framework, an open ended form affixed to said framework, a plurality of articulated workpiece engaging grapple means mounted on the inside of said form and adapted to cooperate with a pair of adjacent sides of said form in holding a workpiece in the form, means for inserting a workpiece into said form through the open end thereof, means for selectively operating one of said grapple means prior to another of said grapple means whereby said one grapple means can shift the workpiece and fully position the workpiece within said form so that it can be worked on, high pressure means for actuating all of said grapple means whereby all of said grapple means can then clamp the workpiece rigidly to the form during the work performing operation, stop means on the form and engageable by the workpiece for aligning the workpiece with the form and the means for inserting the workpiece through the open end of the form including a movable cradle means aligned with the open end of the form.

14. A workpiece positioning and securing apparatus as set forth in claim 13, including means floatingly mounting said cradle means.

15. A workpiece positioning and securing apparatus comprising the combination of a framework, an open ended form affixed to the framework, a first workpiece engaging grapple means mounted on said form, a second workpiece engaging grapple means mounted on said form, said first and second grapple means being angularly disposed relative to each other, means for operating said first and second grapple means in a successive fashion whereby one of said grapple means can slidably engage one portion of a workpiece inserted within said form through an open end thereof while said other grapple means can engage an adjacent portion of the workpiece so as to effect a shifting of said workpiece in the form and thereby precisely orient and position the workpiece relative to a work performing member, means operable when said workpiece has been positioned to actuate all of said grapple means and effect a tight clamping of the workpiece in said form, a common means for inserting a workpiece through the open end of the form and for cooperating with said grapple means to hold and clamp the workpiece in the final precise working position, said common means comprising a workpiece cradle elevator.

16. A workpiece positioning and securing apparatus comprising the combination of a framework, an open ended form affixed to the framework, a first workpiece engaging grapple means mounted on said form, a second workpiece engaging grapple means mounted on said form, said first and second grapple means being angularly disposed relative to each other, means for operating said first and second grapple means in a successive fashion whereby one of said grapple means can slidably engage one portion of a workpiece inserted within said form through an open end thereof while said other grapple means can engage an adjacent portion of the workpiece so as to effect a shifting of said workpiece in the form and thereby precisely orient and position the workpiece relative to a work performing member, means operable when said workpiece has been positioned to actuate all of said grapple means and effect a tight clamping of the workpiece in said form and spacer elements on said form for maintaining the workpiece in a slightly spaced relationship relative to the sides of the form.

17. A workpiece positioning and securing apparatus comprising the combination of a framework, an open ended form affixed to said framework, a plurality of articulated workpiece engaging grapple means mounted on the inside of said form and adapted to cooperate with a pair of adjacent sides of said form in holding a workpiece in the form, means for inserting a workpiece into said form through the open end thereof, means for selectively operating one of said grapple means prior to another of said grapple means whereby said one grapple means can shift the workpiece and fully position the workpiece within said form so that it can be worked on, high pressure means for actuating all of said grapple means whereby all of said grapple means can then clamp the workpiece rigidly to the form during the work performing operation, stop means on the form and engageable by the workpiece for aligning the workpiece with the form and certain sides of said form provided with said grapple means also being provided with openings for receiving drilling tools, said openings being interdigitated with certain of said grapple means.

References Cited
UNITED STATES PATENTS

| | | | |
|---|---|---|---|
| 1,873,547 | 8/1932 | McClintic | 77—63 |
| 2,182,154 | 12/1939 | Lancaster. | |
| 2,655,059 | 10/1953 | Halvorsen | 77—22 X |
| 2,938,480 | 5/1960 | Irwin. | |
| 3,127,661 | 4/1964 | McConnell | 29—33 |

GERALD M. FORLENZA, *Primary Examiner.*

GEORGE F. ABRAHAM, *Assistant Examiner.*

U.S. Cl. X.R.

77—22, 5; 214—95